United States Patent Office 3,069,220
Patented Dec. 18, 1962

3,069,220
PROCESS FOR DYEING POLYOLEFINS
Ross R. Dawson, Tonawanda Township, Erie County, N.Y., assignor to Allied Chemical Corporation, New York, N.Y., a corporation of New York
No Drawing. Filed Jan. 28, 1960, Ser. No. 5,123
8 Claims. (Cl. 8—55)

This invention relates to a process for dyeing olefin polymers, and more particularly to dyeing normally solid polymers of olefins having from 2 to 3 carbon atoms, in the form of solid filaments, yarns, films, pellets, molded articles and the like.

Polymers of olefins such as ethylene and propylene have been produced in steadily increasing quantities and grades in recent years, and, because of their many valuable characteristics of strength, resistance of solvents and other elements, etc., have found their way into a multitude of useful applications in the form of films, filaments, yarns, fabrics, ropes, molded products and the like.

Because of the general inertness of these polymers and their extremely hydrophobic characteristics, attempts at coloration of these materials have presented serious problems which have not heretofore been adequately solved. Thus, attempts to effect the coloring of polyethylene by compounding pigments into the plastic as in Banbury mixers, compound extruders or the like were not entirely satisfactory due to difficulty in obtaining adequate dispersion of the color. Introduction of a pigment dispersion into a finely divided, molten polyethylene, while satisfactory for some purposes, is inflexible and disadvantageous in requiring the ultimate fabricator to maintain stocks of all colors he may be likely to need, and in not yielding the wide variety of shades and tints which might be obtained if the formed yarn or other product could be treated by conventional dyeing techniques.

A method of dyeing polyethylene fibres by conventional dyeing procedures has recently been disclosed in which oil solutions of oil-soluble dyes are emulsified in water. Such emulsions, when applied to polyolefin textiles in aqueous dyebaths, produce light to medium shades of acceptable fastness characteristics, but tend to leave a residue of the carrier oil on the goods, which is removed only with difficulty as by drastic soaping or extraction processes, and/or cause such excessively high shrinkage of the polyolefin fibres as to render this method uneconomic.

It is a principal object of the present invention to provide an effective process for the coloration of normally solid polymers of olefins having from 2 to 3 carbon atoms using conventional dyeing procedures.

A further object of the invention is to provide a process for dyeing polyethylene and polypropylene fibres with water-insoluble dyestuffs which does not require removal of oil from the dyed fibres.

A still further object of the invention is to provide a process for dyeing polyethylene and polypropylene fibres in which excessive shrinkage of the fibres is avoided.

These and other objects are accomplished according to my invention wherein normally solid polymers of olefins having from 2 to 3 carbon atoms are contacted in solid form at a temperature below the fusion point of the polymer, with a substantially neutral aqueous dispersion of a water-insoluble organic dyestuff having affinity for the polyolefin, in a mixture of a water-miscible, liquid polyhydric alcohol or alkyl ether of a polyhydric alcohol, having a boiling point under standard conditions of at least 125° C. and preferably between about 125° C. and about 300° C., and a surface active agent.

In carrying out the process according to my invention, the water-insoluble dyestuff is first dissolved in the water-miscible polyhydric alcohol or ether. To the dyestuff solution thus prepared is added with agitation a surface active agent and water, whereby a neutral dispersion of dyestuff in water results. The initial dispersion is advantageously prepared with a relatively small amount of water to produce a concentrated stock solution which can be diluted further with water to obtain the desired concentration of dyestuff in the ultimate dyebath. Dyeing of the polyolefin material is carried out by conventional techniques, for example, by introducing it in yarn or other form into the dyebath, heated to a suitable, elevated temperature below the fusion point of the polyolefin. Dyeing is continued for a sufficient period of time to obtain the desired coloration, usually about one hour. The dyed material is then rinsed with water, washed with warm (60° C.) soap solution, again rinsed with water and dried.

The polyolefin so dyed is not only colored in stronger tints than those produced by the prior art mineral oil-emulsion procedure, but, in the case of filaments and yarns, virtually complete penetration of the color throughout the depth of the fibres is effected. The dyeings of my invention are more readily scoured than the oil-emulsion treated fibres to remove the small traces of surface color left on the goods, resulting in better fastness to crocking than found in the prior art dyed polyolefins. The dispersant liquid, being miscible with water, is readily removed from the fibres which require no drastic soaping or extraction treatment such as is required in the oil-emulsion process. Fibre shrinkage is small, being substantially the same as occasioned by exposure to water alone for the same time at the same temperatures, namely between about 6% and about 10%, and in any case substantially less, usually about 60% less, than the shrinkage resulting from prior art oil-emulsion dyeings, which often result in shrinkages of as much as 30% in dyeing polyethylene fibres and up to 16% or more in dyeing polypropylene fibres.

The process may be carried out in conventional equipment available to the dyer, and hence has the economic advantage of requiring no additional capital investment for special facilities.

Normally solid polyethylenes and polypropylenes can be dyed successfully according to my process.

Polyethylene materials suitable for dyeing, according to my invention, can be those polymers from ethylene known as high pressure or conventional polyethylenes, i.e. those having densities below about 0.93 and molecular weights ranging from say about 1,000 upwards, usually between about 10,000 and about 30,000; or they may be the so-called "low-pressure" polyethylenes having densities above about .93 and molecular weights above about 50,000, usually in the range of between about 100,000 and about 5,000,000.

As is well known, polymers from ethylene are structurally, long chains made up essentially of recurring —$CH_2$— groups, the number of carbon atoms in the chain varying from as low as 60 to as high as 400,000. Such polyethylenes may contain a small number of branched chains, or when polymerized in the presence of a co-reactant, may contain terminal groups such as alcohol, ester, ketone or ether groups, this latter procedure often being practiced in preparation of the very low molecular weight polyethylenes, i.e. 1,000–5,000 as disclosed, for example, in U.S. Patents 2,683,141 and 2,504,400 of Michael Erchak, Jr. These low molecular weight polyethylenes are waxy in nature and usually have melting points between about 85° and 105° C., specific gravities of about .92 and viscosities at 140° C., between about 100 and about 230 centipoises. These low molecular weight polyethylenes can be dyed in pellet or molded form at temperatures below their melting temperatures.

The higher molecular weight polyethylenes which include both the so-called "high pressure" polyethylenes which have molecular weights, for example, from about 10,000 to about 30,000, and also the so-called "low pressure" polyethylenes which have molecular weights above about 50,000 and up to 5,000,000 or higher and which are available in filament, yarn, film, etc. forms, and which usually have melting or softening points above 100° C. can be dyed according to my invention. Both the above types of materials are well known and have been described in the patent and other literature, for example, U.S.P. 2,153,553 issued April 11, 1939 to Fawcett et al. and 2,188,465 issued January 30, 1940 to Perrin et al. describe preparations of "high pressure" polyethylene, while U.S.P. 2,825,721, issued March 4, 1958 to Hogan et al.; U.S.P. 2,824,089 issued February 18, 1958 to Peters et al. and U.S.P. 2,912,424 issued November 10, 1959 to George O. Cash, Jr. disclose methods of making "low-pressure" polyethylene.

Suitable polypropylene materials are those which are usually prepared by a "low-pressure" process similar to those indicated for polyethylene above.

All of the above described polyolefins can be dyed after conversion to any of their usual useful forms including filaments, staple fibre, tow, rope, yarns, slubbings, warps, fabric, felts, films, pellets or molded articles.

In general, it is desirable to carry out the dyeings at temperatures which are as high as possible to insure the most rapid and complete penetration of the dyestuff into the polyolefin material. Low pressure polyethylenes, which are distinguished by high heat resistance as well as high strength, can be dyed at temperatures approaching the boiling point of the dyebath, for example, between about 95° and about 100° C., without adversely affecting their desirable properties and without significant shrinking or dimensional distortion. The high pressure polyethylenes, however, when dyed at or near the boiling point of the dyebath tend to shrink excessively so that in dyeing these polyethylenes it has been found desirable to employ dyebath temperatures below 70° C., preferably between 50° C. and 65° C. to insure high dimension stability.

Polypropylene materials can advantageously be dyed at temperatures between about 90° and about 100° C.

The water-insoluble dyestuffs suitable for use in the process of my invention are characterized by having affinity for the polyolefin, i.e., they either have substantivity for, or are soluble in the polyolefin, and are characterized by solubility of at least about 0.05% by weight, at 50° C. in diethylene glycol. Among the suitable dyes in this category, are those described in Colour Index, second edition, volume 2, pages 2815 and following, which are soluble in glycols, and are grouped therein as class 1 (see ibid p. 2815). This group includes various azo, xanthene, anthraquinone and triaryl methane dyes. Illustrative of these dyes are C.I. Solvent Blue 16
C.I. Solvent Yellow 40
C.I. Solvent Yellow 39
C.I. Solvent Brown 16
C.I. Solvent Orange 22
C.I. Solvent Orange 7
C.I. Solvent Orange 14

Also suitable are those described in Colour Index, second edition, vol. 1, pages 1655 et seq. as "disperse dyes" and belonging to a number of chemical classes including the aminoazo, nitroarylamine and aminoanthraquinone groups; also the nitrodiaryl amines and the nitroamino derivatives of diarylmethanes. Examples of this type are found in the Colour Index section referred to. Suitable anthraquinone dyes of the disperse class include, for example, 1 - amino-5(3-dimethylamino)propylaminoanthraquinone (red); 1-amino-2-bromo-4-hydroxyanthraquinone (blue red) and 1-ethylamino - 4 - methylaminoanthraquinone (blue); 1,4-di(betahydroxyethylamino)-5-hydroxyanthraquinone (greenish blue) and 1-amino - 4 - methylaminoanthraquinone (blue-violet); suitable aminoazo dyes include 4-nitro-4'-amino-2',5'-dimethylazobenzene (red) C.I. Solvent Brown 16. Vat dyestuffs in general are unsuitable for use in my process because they are generally insoluble in glycols. Water-soluble dyestuffs generally cannot be used, because such dyes have no or at most insufficient affinity for the polyolefins.

The amount of dyestuff employed relative to the amount of polyethylene material to be dyed can be varied over a wide range and will depend to a major extent upon the depth of shade desired. Excellent penetration of the dyestuff into the material, as evidenced by microscopic examination of the dyed materials, is a characteristic of dyeings obtained by the process of this invention. This result may account for the excellent fastness of the resultant dyeings and also for the fact that relatively small amounts of dyestuff are required to give maximum colorations. Thus in most instances, deep shades are obtained from 0.5% dyeings, which deep shades are not substantially increased in intensity by increasing the dye concentration (with respect to the amount of polyethylene) to 2.0% or more. Further, adequate colorations, i.e. satisfactory light shades, can be obtained by the use of as little as 0.1% of dyestuff.

The water-soluble dispersants used in my process are the normally liquid polyhydric alcohols, including the polyhydric thioalcohols, and lower alkyl ethers of such polyhydric alcohols having boiling points under standard conditions of at least about 125° C., preferably between about 125° C. and about 300° C., such as the compounds listed below.

(I) Water soluble polyhydric alcohols:
Glycol
Glycerine
Propylene glycol
Butanediol 1,4
Propane diol 1,4
Butanetriol 1,2,4
Hexanetriol 1,2,6
Diethylene glycol
Triethylene glycol
Thiodiethylene glycol
Dithiotriethylene glycol (II) Alkyl ethers of polyhydric alcohols:
Diethylene glycol monomethyl ether
Diethylene glycol monoethyl ether
2-butoxyethanol (glycol monobutyl ether)
2-methoxyethanol (glycol monomethyl ether)
2-ethoxyethanol (glycol monoethyl ether)

The amount of such polyhydric alcohol or ether dispersant liquid used can be varied over a broad range and will depend in part upon the solubility of the dyestuff in the particular liquid or mixture thereof selected, i.e. the more soluble the dyestuff the less the amount of liquid required. In general, at least about 50 parts by weight of polyhydric alcohol or ether per part of dyestuff should be used and preferably between about 100 and about 200 parts should be used. Greater amounts can be used but no advantage appears to result therefrom and hence such excesses may be regarded as wasteful.

Aqueous dispersions prepared from such dyestuff solutions are extremely stable and, when prepared with the preferred non-ionic surface active agents, can be subjected to virtually infinite dilution with water without any apparent damage to the dispersion. Thus dyebaths of any desired strength below the maximum which can be imparted by the particular dyestuff can be empployed. In general dispersions containing between about 0.01% and about 1% dyestuff based on the weight of total dispersion, are suitable.

The surface active agents which are suitable for use in my process include those of the non-ionic, anionic and cationic groups. The preferred surfactants are of the non-ionic type, especially the condensation products of ethylene oxide with a hydrophobic material such as a long chain aliphatic alcohol, acid, ester, ether or an alkyl phenol. These products are characterized by containing as the hydrophilic portion of the molecule a plurality of oxyethylene moieties as illustrated in the formulas given below.

(1) R—O—(CH$_2$—CH$_2$O)$_x$—CH$_2$—CH$_2$OH wherein R is an alkyl group having from 12 to 22 carbon atoms or an alkyl phenol residue wherein the alkyl group contains from 6 to 13 carbon atoms inclusive and wherein $x$ is at least 4 especially between about 6 and about 40.

Commercial examples of products in this group include "Triton X-100" wherein R is an alkyl phenol residue wherein the alkyl group is isooctyl and wherein $x$ is 7 to 9; "Triton X-102" wherein R is an isooctyl phenol residue and $x$ is 11; "Tergitol NPX" wherein R is ethylhexyl phenol residue and $x$ is 8 to 9; "Neutronic 600" wherein R is nonyl phenol residue and $x$ is 9; "Emulphor ELN" wherein R is dodecyl phenol residue and $x$ is 19.

(2) Condensation products of fatty acids and polyethylene glycols having the general formula RCOO—(CH$_2$CH$_2$O)$_x$CH$_2$CH$_2$OH wherein R is a long chain alkyl group having from 12 to 18 carbon atoms inclusive and $x$ is an integer from 8 to 40 inclusive.

(3) Polyoxyethylene derivatives of hexitol anhydride or sorbitol fatty acid esters such as "Tween 80."

(4) Polyoxyethylene ethers

R—O(CH$_2$CH$_2$O)$_x$CH$_2$CH$_2$OH wherein R is an alkyl group having from 6 to 18 carbon atoms and $x$ is an integer from 4 to 40 inclusive. A commercial product which is an example of this group is Brij 30 in which R is lauryl and $x$ is believed to be 10.

I can also use the anionics such as highly sulfated fatty acid esters, e.g. lauryl sulfate (Tetranols) and alkyl aryl sulfonates, e.g. dodecylbenzene sodium sulfonate, keryl benzene sodium sulfonate (Nacconol NRSF) and cationics such as quaternary ammonium compounds (Sapamine KW, Ethoquad 18/12). Such compounds, while suitable in most instances, have been observed to produce poor fastness to rubbing or poor dispersions in some instances.

In the dyeing process of my invention, the presence of the synthetic organic surface active agent acts to assist in the dispersion of the dyestuff in the dyebath and to maintain a uniform dispersion in the dyebath throughout the dyeing operation. By preventing settling out and flocculation of the dyestuff a more uniform distribution of color on the surface of the fiber is achieved which permits uniform diffusion of the dye from the surface of the fiber to the center.

Relatively small amounts of the surface active agent are sufficient to produce satisfactory results. As little as 0.5 part by weight per part of dyestuff can be used. Preferably from about 1 to about 4 parts per part of dyestuff and especially from about 2 to about 3 parts are used.

As pointed out above, it is often advantageous to prepare the aqueous dye dispersions in the form of concentrated stock dispersions and to dispense the dispersion as required. This procedure is especially advantageous and convenient when several dyeings of different strengths of shade are to be carried out. These aqueous dispersions can subsequently be diluted at will to obtain the desired strength dyeings.

The following examples illustrate the present invention. The temperatures are given in degrees centigrade and parts are by weight unless otherwise specified.

*Example 1*

A stock dispersion was prepared from the following ingredients as follows:

C.I. Solvent Yellow 14, aniline→β naphthol dye, 0.1 part, was dissolved in 10 parts of diethylene glycol by warming to 60°. To the resultant solution, 0.25 part of a condensation product of one mol of isooctyl phenol with 8–10 moles of ethylene oxide (Triton X–100) was added with agitation, followed by addition of 89.65 parts of water. The resultant dispersion was agitated for 5 to 10 minutes whereby a homogeneous mass was obtained.

A dye bath was prepared by diluting 30 parts of the above prepared stock dispersion with 30 parts of distilled water and the mixture warmed to 60°. To this mixture, 1.5 parts of low pressure polyethylene yarn, .012" monofilament, high tenacity grade, were added and the bath heated to 95°. The dyeing was continued at this temperature for 1 hour. The dyed yarn was then rinsed in warm water, soaped in 0.5% soap solution at 60° for 15 minutes, rinsed with warm and then with cold water and finally dried in air.

The yarn was dyed a deep orange shade. By microscopic examination of cross sections of the dyed filaments, it was determined that the dyestuff penetrated the entire fiber. The dyed fiber also possessed excellent fastness to crocking.

*Example 2*

In the manner described in Example 1 above, a stock dispersion was prepared consisting of

| | Parts |
|---|---|
| 1-ethylamino-4 methyl anthraquinone | 0.1 |
| Diethylene glycol | 20.0 |
| Triton X–100 | 0.25 |
| Water | 79.65 |

A dye bath consisting of 30 parts of the resulting dispersion and 30 parts of distilled water was used to dye 1.5 parts of low pressure polyethylene mono filaments .012 inch gauge, in the manner described in Example 1 above. The filaments were dyed a bright blue shade of excellent fastness to washing and fastness to crocking. Microscopic examination indicated that the dye in this instance penetrated to a slightly lesser extent than the dye used in Example 1 but this apparently had no adverse effect on the fastness qualities of the dyed product.

*Example 3*

Low pressure polyethylene filaments of 0.012 inch gauge were dyed by the procedure described in Example 1 above using 0.1 part of C.I. Solvent Yellow 40 (aniline→1 phenyl-3-methyl-5-pyrazole), 10 parts of diethylene glycol monoethyl ether (Carbitol), in place of C.I. Solvent Yellow 14 and diethylene glycol respectively. The dyed material was colored bright yellow and possessed very good fastness to light and rubbing.

*Example 4*

The dyeing procedure of Example 3 was repeated using 0.1 part of 1-amino-2-brom-4-hydroxyanthraquinone in place of C.I. Solvent Yellow 40 in dyeing low pressure polyethylene filaments .012 inch gauge. Excellent bright bluish red dyeings possessing very good fastness to light and to rubbing were obtained.

*Example 5*

Fifty parts of the stock dispersion of C.I. Solvent Yellow 14 prepared as described in Example 1 above were diluted with 50 parts of water and the mixture warmed to 60°. To this bath, 2.5 parts of high pressure polyethylene monofilament, 0.21" gauge, were entered and dyed for 1 hour at this temperature. The dyed yarn was rinsed in warm water, soaped in a 0.5% soap solution at 60° for 15 minutes, then rinsed and dried in air. The dyed yarn was colored an orange shade which was similar in strength and shade to that obtained in Example 1, and which possessed excellent fastness to crocking.

*Example 6*

A solution consisting of 0.015 part of Oil Scarlet 6G, 1.5 parts of diethylene glycol and 0.25 part of "Triton X–100" was added to 58.5 parts of hot (65°) water while agitating the water vigorously. To the resulting dispersion, 1.5 parts of low pressure polyethylene yarn (.012 inch gauge) was entered and the bath was heated to 90° in 10 minutes. The dyeing was continued at this temperature for 1 hour. The dyed yarn was rinsed, soaped, rinsed and dried in the usual manner. Strong, bright orange shades of good fastness properties were obtained.

Fibre shrinkage in the dyeings of the foregoing Examples 1–6 inclusive amounted to about 10% whereas, when the same fibres were dyed with emulsions of toluene or other similar hydrocarbon oil solutions of the same dyestuffs, fibre shrinkages of between 20% and 30% resulted.

*Example 7*

A. Samples of two polypropylene yarns, one of 200 denier/36 ply and one of 1300 denier/72 ply, were dyed with each of the three dyestuffs:

C.I. Solvent Yellow (40 aniline→1-phenyl-3-methyl-5-pyrazolone.
C.I. Solvent Red 26 (o-toluidine→2,5-xylidine→β-naphthol).
Oil Blue BGS (1,5-diisopropylaminoantharaquinone).

by using stock solutions prepared by dissolving 1 gram of each of the red and blue colors in 98 grams of thiodiethylene glycol and adding 1 gram of an aromatic polyglycol ether (Igepal CA–630), and dissolving the yellow in a mixture of 67 grams of diethylene glycol monoethyl ether (Cellosolve), 28 grams of thiodiethylene glycol and 1 gram of the Igepal CA–630).

Five-tenths percent dyeings were made by diluting the necessary amount of stock solution with hot water to a 1/40 fibre/dyebath volume. Scoured polypropylene yarns were introduced into the dyebaths and dyed for 60 minutes at 95° C., after which the dyed yarns were given a hot rinse followed by soaping in a ¼% soap solution for 5 minutes at 60° C. to remove excess surface color.

Cross sections of the dyed fibres showed substantially complete penetration of the dyestuff into, and uniform diffusion throughout the filaments. Fastness to washing, crockfastness and resistance to dry cleaning were satisfactory. Shrinkage of the fibres was similar to that produced by boiling water alone.

Similar results were obtained when polypropylene fibres were heated in a similar manner with dispersions of 4-nitro-4'amino-2',5'-dimethoxyazobenzene and 1-amino-4-methylaminoanthraquinone.

B. For comparison purposes, two polypropylene yarns as described above were dyed with aqueous emulsions of oil solutions of the three above dyestuffs prepared by dissolving 1 gram of the color in 50 parts of a mixture of a hydrocarbon oil containing 84 parts tetrahydronaphthalene, 56 parts cyclohexanol and about equal parts of a surface active agent, and diluting with water, dyeing and scouring in a manner similar to that described above. Shrinkages of the yarns dyed according to method A of my invention were compared with those dyed according to oil emulsion technique of method B and when boiled in water alone, as directly measured after making ½% dyeings at 95° C. and at boiling temperature, with the results given in the table below.

*Table*

|  | Yarn Shrinkage, percent | |
| --- | --- | --- |
|  | 1300/72 | 200/36 |
| Water at 95° | 8 | 5 |
| Water at boil | 10 | 6 |
| Method A at 95° | 10 | 6 |
| Method A at boil | 10 | 6 |
| Method B at 95° | 13 | 8.5 |
| Method B at boil | 16 | 10 |

It can thus be seen that a novel and efficient method has been devised for the dyeing of polyethylene and polypropylene materials. Moreover, it will be evident that the invention is not limited to the details of the foregoing illustrative examples and that changes can be made without departing from the scope of the invention.

The presence of the high boiling water-soluble dispersant liquid as defined is believed to be necessary to obtain the beneficial effects of this invention. Although it is not known with certainty how this adjuvant acts in the process it is believed that the dispersant liquid assists in some manner in the distribution of the dyestuff in the polyolefin. Whatever the reason, its presence is necessary for it has been found that the dyeings obtained in the absence of the dispersant liquid are considerably weaker, less fast and penetrate the polyolefin to a lesser degree.

I claim:

1. The process for dyeing normally solid polymers of olefins having from 2 to 3 carbon atoms inclusive, which comprises forming a solution of a water-insoluble organic dyestuff having affinity for the olefin polymer, in a water-miscible liquid selected from the group consisting of polyhydric alcohols and alkyl ethers of polyhydric alcohols having boiling points between about 125° C. and about 300° C., precipitating said dyestuff from said solution by dilution with sufficient water in the presence of a surface active agent, to produce a dispersion containing not more than about 20% of said water-miscible liquid, and thereafter contacting the solid olefin polymer at a temperature below its fusion point with the resulting dispersion of water-insoluble dyestuff.

2. The process according to claim 1 wherein the olefin polymer is polyethylene.

3. The process according to claim 1 wherein the olefin polymer is polypropylene.

4. The process according to claim 1 wherein the surface active agent is a non-ionic condensation product of a plurality of ethylene oxide groups with a member selected from the group consisting of alkyl phenols, long chain fatty acids and long chain fatty acid esters.

5. The process according to claim 2 wherein the surface active agent is the condensation product of one mol of isooctyl phenol with between 8 and 10 mols of ethylene oxide.

6. The process for dyeing normally solid polymers of olefins having from 2 to 3 carbon atoms inclusive, which comprises dissolving a water-insoluble dyestuff characterized by solubility to the extent of at least about 0.05% by weight at 50° C. in diethylene glycol and by affinity for polyethylene, in at least about 50 parts per part of dyestuff of a water-miscible liquid selected from the group consisting of polyhydric alcohols and lower alkyl ethers of polyhydric alcohols having a boiling point between about 125° C. and about 300° C., adding with agitation to the dyestuff solution thus prepared between about 0.5 part and about 4 parts by weight of a surface active agent dissolved in water, whereby an aqueous dispersion of the dyestuff is formed, adjusting the concentration of the dispersion with water, to contain between about 0.01% and about 1% of dyestuff and not more than about 20% of said water-miscible liquid, introducing into said dispersion the normally solid polyolefin, and maintaining said dispersion at a temperature between about 50° C. and about 95° C. until said polyolefin has become colored with said dyestuff.

7. The process according to claim 6 wherein the surface active agent is a condensation product of one mole of isooctyl phenol with between 8 and 10 moles of ethylene oxide.

8. A dyebath suitable for dyeing polyolefins, comprising a dispersion of one part of water-insoluble, polyolefin-affinitive organic dyestuff having a solubility in diethylene glycol of at least 0.05% at 50° C., in 100 to 10,000 parts of aqueous solution containing not more than about 20% of a water-miscible liquid boiling between about 125° C. and about 300° C. selected from the group consisting of polyhydric alcohols and alkyl ethers of polyhydric alcohols, and 0.5 to 4 parts of a surface active dispersing agent, said dispersion having been formed by dissolving said water-insoluble dyestuff in said water-miscible liquid and thereafter precipitating the dyestuff by dilution with water in the presence of a surface active agent.

References Cited in the file of this patent

UNITED STATES PATENTS

| | | |
|---|---|---|
| 2,047,650 | Sala | July 14, 1936 |
| 2,069,210 | Bishop | Feb. 2, 1937 |
| 2,537,726 | Wittcoff | Jan. 9, 1951 |

FOREIGN PATENTS

| | | |
|---|---|---|
| 524,699 | Italy | Apr. 28, 1955 |
| 809,495 | Great Britain | Feb. 25, 1959 |
| 205,452 | Austria | Mar. 15, 1959 |
| 814,582 | Great Britain | June 10, 1959 |

OTHER REFERENCES

Vickerstaff: "The Physical Chemistry of Dyeing," 2nd ed., 1954, Interscience Publishers Inc., pp. 335 and 336.

UNITED STATES PATENT OFFICE
CERTIFICATE OF CORRECTION

Patent No. 3,069,220                                            December 18, 1962

Ross R. Dawson

It is hereby certified that error appears in the above numbered patent requiring correction and that the said Letters Patent should read as corrected below.

Column 1, line 17, for "of", second occurrence, read -- to --; column 4, line 70, for "empployed" read -- employed --; column 7, line 35, "Oil Blue BGS (1,5-diisopropylaminoantharaquinone)" read -- Oil Blue BGS (1,4-diisopropylaminoanthraquinone) --.

Signed and sealed this 25th day of June 1963.

(SEAL)
Attest:

ERNEST W. SWIDER                                    DAVID L. LADD
Attesting Officer                                       Commissioner of Patents